United States Patent [19]
Berger et al.

[11] Patent Number: 4,682,672
[45] Date of Patent: Jul. 28, 1987

[54] SNAP-ON OIL PAN

[75] Inventors: Alvin H. Berger, Wyandotte; Roy E. Diehl, Northville, both of Mich.

[73] Assignee: Ford Motor Company, Dearborn, Mich.

[21] Appl. No.: 854,286

[22] Filed: Apr. 21, 1986

[51] Int. Cl.[4] ............................................. F16N 31/00
[52] U.S. Cl. ..................................... 184/106; 220/1 C;
220/326; 123/195 C; 123/198 E; 403/338
[58] Field of Search ................. 184/1.5, 106; 403/338;
285/317, 319; 220/1 C, 324, 326, 293, 297;
123/195 C, 198 E

[56] References Cited

U.S. PATENT DOCUMENTS

| | | | |
|---|---|---|---|
| 2,002,211 | 5/1935 | Torney | 184/106 |
| 2,053,297 | 9/1936 | Nittel | 184/106 |
| 2,724,378 | 11/1955 | Wellman | 123/198 R |
| 2,837,063 | 6/1958 | Martinez | 123/195 C |
| 3,678,914 | 7/1972 | Vulliamy | 123/195 C |
| 3,722,927 | 3/1973 | Miska | 285/317 |
| 4,294,333 | 10/1981 | Little | 184/106 |
| 4,314,651 | 2/1982 | Gaiser | 220/326 |
| 4,394,853 | 7/1983 | Lopez-Crevillen | 184/106 |
| 4,577,713 | 3/1986 | Moon | 184/106 |

FOREIGN PATENT DOCUMENTS 363657 6/1923 Fed. Rep. of Germany .
2431651 2/1980 France .

Primary Examiner—Carlton R. Croyle
Assistant Examiner—Jane E. Obee
Attorney, Agent, or Firm—Robert E. McCollum; Clifford L. Sadler

[57] ABSTRACT

An automotive type internal combustion engine has an oil pan that is easily attached and disassembled from the skirt of the engine block by means of a snap-on type connector that includes a springable-like retaining plate removably attached to the upper edge of the oil pan and having right angled end portions springably engaged through slots in the oil pan wall for projection to a location above the ledge of the engine block skirt for supporting the oil pan upon the ledge and securing it to the block, the end portions of the retaining plate being cammed outwardly upon upward assembly of the oil pan to the block ledge and springably returned into a locking position with respect to the ledge after the ledge has cleared the hook-like ends; disassembly being accomplished by forceably moving the springlike ends outwardly until the block ledge is cleared for vertical removal of the oil pan from the ledge.

11 Claims, 10 Drawing Figures

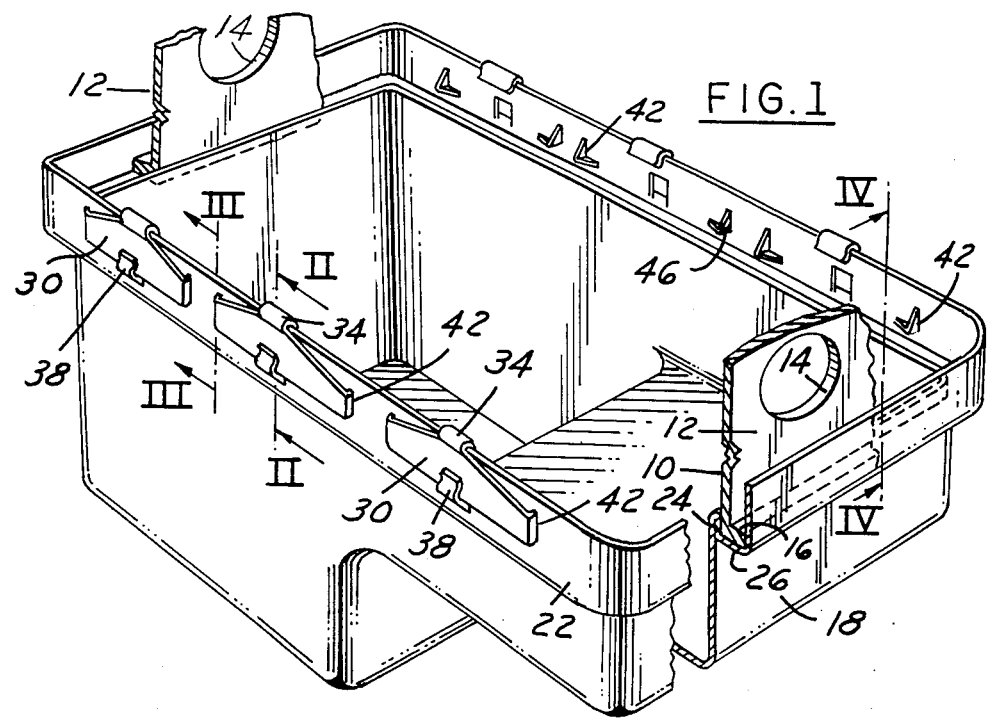
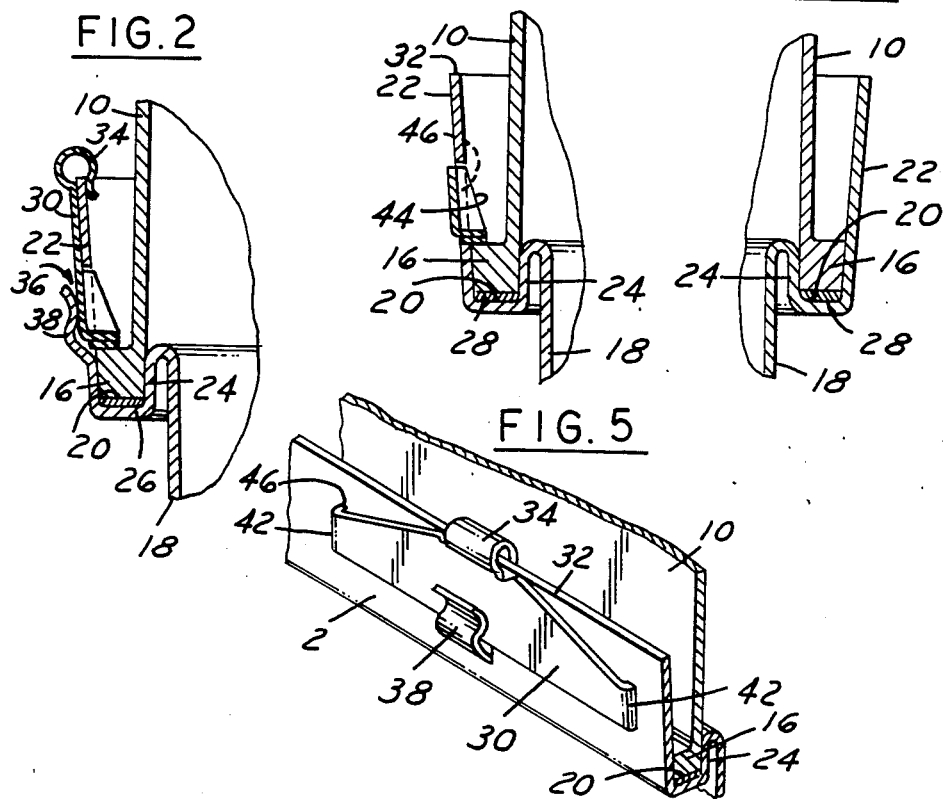

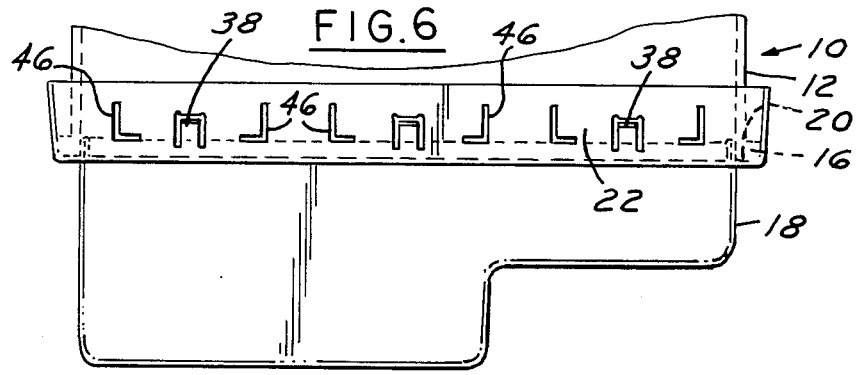
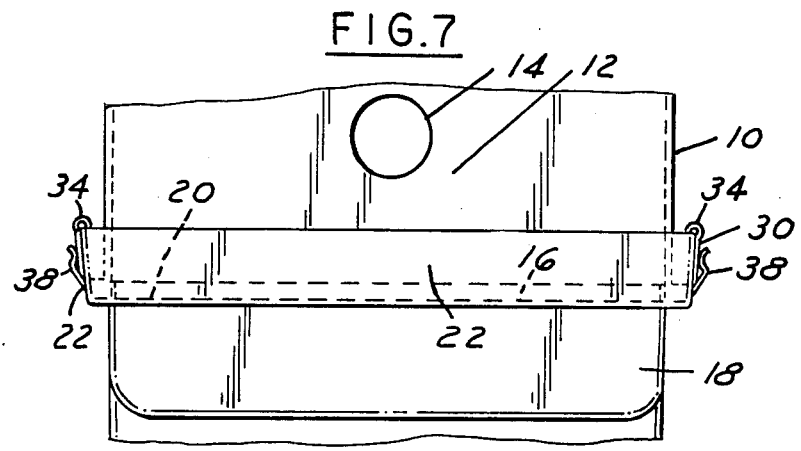
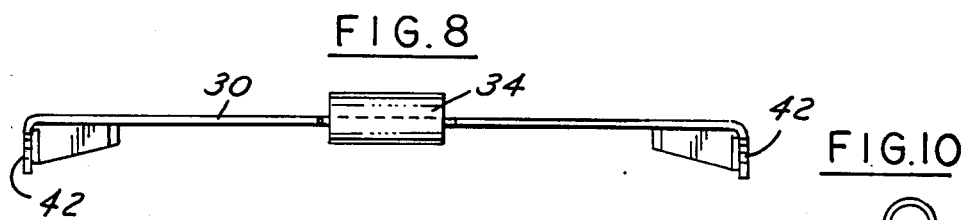
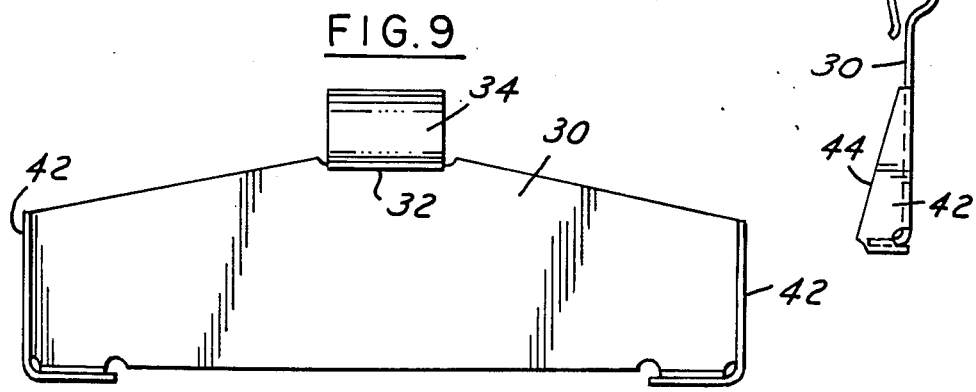
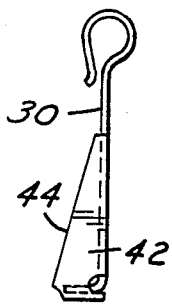

SNAP-ON OIL PAN

This invention relates in general to an oil pan for an automotive type internal combustion engine. More particularly, it relates to one that can be snap assembled to the block of an internal combustion engine without the use of the usual screws, bolts, clamps or similar paraphernalia.

Asssembly and disassembly of an engine oil pan to the block of the engine would be much simpler if it need only be snapped into place and unsnapped therefrom rather than having to unscrew or unbolt the assembly. The prior art devices generally are of this latter type. For example, U.S. Pat. No. 4,294,333, Little, uses an adapter between the engine and oil pan and take-up type clamps to secure the assembly together, resulting in a complicated and costly assembly. U.S. Pat. No. 2,053,297, Nittel, uses a hook operable in a recess in the oil pan, together with a bail and a rotary spool for an overcenter action type clamping of the oil pan to the block. U.S. Pat. No. 3,678,914, Vulliamy, shows a typical two-piece bolt-on flange type connection between the oil pan and block. U.S. Pat. No. 2,724,378, Wellman, shows a valve cover assembled to the cylinder head by means of overcenter type clamps. German No. 363657 shows a similar type securing of the rocket arm cover to the cylinder head. French No. 2 431 651 shows a trough shaped element bolted to the underside of the engine block for receiving therein a reversely bent flange on the upper portion of the oil pan.

This invention relates to a relatively simple snap-on type connector secured to the engine oil pan for attachment to the horizontal ledge extending from the bottom of the skirt of the engine block to firmly secure the two together without the use of the usual screws or bolts or other similar devices. More particularly, it provides a plurality of resilient or spring-like flat plates with hook-like end portions that engage the engine block ledge through slots in the oil pan to support the oil pan upon the ledge, the projecting portions having ramp-like surfaces that are cammed outwardly by the ledge to clear it as the oil pan is moved upwardly against the ledge, the hooks then returning to their free form back over the ledge once they have passed the ledge upper edge to thereafter rest upon and be hooked to the ledge.

It is, therefore, a primary object of the invention to provide a snap-on type oil pan construction that permits easy assembly of the same to the engine block merely by an upward thrust of the oil pan to hook over the lower ledge of the block in a secure manner.

Other objects, features and advantages of the invention will become more apparent upon reference to the succeeding detailed description thereof, and to the drawings illustrating the preferred embodiment thereof; wherein FIG. 1 is a perspective view of an oil pan embodying the invention secured to a portion of an internal combustion engine;

FIG. 2, 3 and 4 are enlarged cross-sectional views taken on planes indicated by and viewed in the direction of the arrows II—II, III—III, and IV—IV, respectively of FIG. 1;

FIG. 5 is an enlarged view of a detail of FIG. 1;

FIG. 6 is a side elevational view on a reduced scale of the oil pan of FIG. 1;

FIG. 7 is an end elevational view of the construction illustrated in FIG. 1; and FIGS. 8, 9 and 10 are plan, front elevational, and side elevational views, respectively, of a detail illustrated in FIG. 5.

FIGS. 1, 6 and 7 show the lower skirt portion 10 of an internal combustion engine formed at opposite ends with crankshaft bearing caps 12 for the rotatable support of a crankshaft at 14. As best seen in FIG. 1, the bottom or lower edge or pan rail of the skirt 10 is formed with an outwardly extending horizontal ledge 16 that extends completely around the skirt.

The oil pan, indicated at 18, is of a stepped design, although such a shape is of no significance with respect to the invention. As best seen in FIGS. 2-4, the upper peripheral edge of the oil pan is reversely bent in the shape of a trough 20 defined by two vertical sidewalls 22 and 24 spaced by a horizontal base 26. This defines an upwardly opening trough 20 of a shape mating that of the ledge 16 with which it cooperates. An elastomeric seal 28 is located in the bottom of the trough to minimize or prevent oil leakage outwardly from the pan and block.

Means for securing the oil pan to the block consists of a number of spring metal like flat retaining plates 30 that are releaseably secured to the top of the oil pan for cooperation with the ledge 16 on the block to support the pan on the ledge. More particularly, the outermost trough wall 22 projects vertically greater than the inner wall 24 to a point indicated at 32. Each retainer plate 30 has a wing-like shape (see FIGS. 1 and 8-10), and is formed with a hook 34 at its uppermost central portion. The latter engages over the upper edge 32 of the oil pan wall 22 for securing the two together with the one flat against the other. The lower edge of the retainer plate 30 fits into a V-shaped opening 36 formed between plate 30 and a finger-like retaining tab 38 that is punched out of the oil pan extension wall 22 at separated points along the wall as indicated at FIG. 1. The retaining plate 30 thus is located vertically by means of the hook portion 34 and the apex of the V-shaped slot 36 defined by the tab 38. The latter also is reversely bent as shown in an S-like shape to exert a biasing force horizontally inwardly against plate 30 to urge it flat against the outer surface of the oil pan extension wall 22.

Turning now to FIGS. 8-10, in addition to FIGS. 2-4, each retaining plate 30 is formed at its end with right angled hook portions 42. The latter are of an essentially triangular shape defining a vertically upwardly extending ramp-like edge 44. The edges being diagonally directed provide a cam follower surface for cooperation with the skirt ledge 16 in a manner to be described to allow the oil pan to be moved upwardly and have a snap-over fit type connection to the skirt ledge. More particularly, the end hook portions 42 of each retaining plate each are adapted to project through a slot 46 punched out of the oil pan wall 22 at spaced intervals as indicated in FIG. 1. The spring bias of the reversed portion of tab 38 biases the right angled end portions 42 through the slots 46 into a position above ledge 16 of the block so that the oil pan then rests upon the ledge and is supported therefrom locked to the ledge, in a manner now to be described.

With the oil pan 18 disassembled from the engine block, the sets of retainer plates 30 (six in this case) are assembled to the top edge of oil pan wall 22 by pushing the plate downwardly over the surface of the wall 22 until the lower edge of each plate engages in the V-shaped groove opening 36 of the tab and the upper edge of the plate is engaged or hooked over the upper edge of wall 22. The width of the retaining plate 30 is such as to permit the hook ends 42 to be sprung or deformed outwardly enough to enable downward sliding movement of the retainer plate 30 until the end portions 42 can slip into the slots 46 in the oil pan.

The oil pan now is ready for assembly to the engine block skirt. The oil pan is aligned with the skirt ledge and moved upwardly until ledge 16 moves within the annular space defined by the upper edge 32 of trough wall 22. As the oil pan moves upwardly, the ramp surface 44 of each hook end 42 of retaining plates 30 engages the lower edge of ledge 16, which then cams the end portions/42 laterally outwardly. This then permits a continued upward movement of the oil pan to receive the ledge 16 within trough 20. As soon as ledge 16 is fully received within the trough, the end hook portions 42 will clear the top surface of ledge 16. The natural bias of tab 38 and the resiliency of each plate 30 then will return the end portions 42 to their free state inwardly to a position just above the upper surface of ledge 16 to thereby lock the block and oil pan against vertical separation. The oil pan, therefore, now is securely fastened to the engine block by a "snap-on" connection.

To disassemble the oil pan from the block, the right angled end portion 42 on each retainer plate 30 is forced outwardly by a suitable tool, such as a screwdriver, for example, simultaneous with the downward movement of the oil pan so that the end portions 42 clear the upper outer edge of ledge 16. The ledge then will maintain the hook end portion 42 in an outward position permitting the downward disassembly of the oil pan from the block.

From the foregoing, it will be seen that the invention provides a quick connect and disconnect of an engine oil pan to the engine block without the use of screws, bolts or other similar paraphernalia common to most assemblies of this type. It will also be seen that this is provided by the use of spring-like retaining plates that are attached to the oil pan in a simple manner and provide a snap-on type connection simply by pushing the oil pan directly upwardly against the lower ledge of the engine block skirt. The two are thus securely fastened together but are easily disassembled.

While the invention has been shown and described in its preferred embodiment, it will be clear to those skilled in the arts to which it pertains that many changes and modifications may be made thereto without departing from the scope of the invention.

We claim:

1. A clip-on type oil pan for attachment to the bottom edge of the skirt of an engine block, the edge including a horizontal ledge extending circumferentially around and outwardly from the skirt, the pan being formed adjacent its upper portion with a trough shaped portion with vertical side walls adapted to receive the ledge therein for attachment of the pan thereto, and fastening means for flexibly securing the pan to the ledge, the fastening means including slot means in the outermost wall of the trough-shaped portion, and flexible retaining means secured to the pan and partially insertable through the slot means above the ledge, the retaining means having a portion thereof resting on the ledge supporting the pan therefrom and locking the pan to the block.

2. An oil pan as in claim 1, wherein the trough outermost wall projects vertically beyond the innermost trough wall and to a location above the ledge when the pan is assembled to the block, when so assembled the slot means being aligned with a space just above the ledge.

3. An oil pan as in claim 2, the retaining means including a flexible flat spring like plate secured flat against the outermost trough wall and having at least at one end a right angled portion for projection through the slot means to rest on the ledge.

4. An oil pan as in claim 3, wherein the right angled portion is angled vertically to form a ramp surface for cooperation with the ledge whereby vertical assembly of the pan to the ledge effects a flexible camming outwardly of the right angled portion by the ledge as it progressively is moved into the trough shaped portion until the top of the ledge passes the bottom of the right angled portion upon continued upward movement of the pan trough thereafter permitting a springable return of the right angled portion to a position to rest on top of the ledge.

5. An oil pan as in claim 4, wherein the plate includes a hook at its uppermost edge engagable over the top edge of the outermost trough wall to maintain the plate flat against the latter wall with the right-angled portion projecting through the slot means.

6. An oil pan as in claim 5, the outermost wall having a springable retaining finger projecting diagonally upwardly therefrom to define an opening between the latter wall and finger for receiving the plate therein in a manner biasing the plate springably against the outermost wall.

7. An oil pan as in claim 6, including seal means in the bottom of the trough shaped portion below the ledge to seal oil leakage outwardly between the two.

8. A clip-on type oil pan for attachment to the pan rail of the skirt of an engine block, the rail including a horizontal ledge extending completely around the skirt, the upper edge of the pan being formed in the shape of a trough for reception therein of the ledge for attachment of the pan to the block, the trough having a pair of laterally spaced vertically extending walls, the outermost wall having at least a pair of circumferentially spaced slots therein located just above the ledge when received fully within the trough, and a spring-like retaining plate secured to the outermost wall to lie flat thereagainst, the plate having a right-angled hook at each end insertable through the slots to be supported on the ledge for securing the pan to the block, biasing means pressing the plate against the outermost wall resiliently biasing the hooks through the slots, each hook having a vertical diagonally directed ramp wider at the bottom than at the top for cooperation with the ledge whereby upward assembly of the trough to the ledge engages the ledge with the ramps camming the hooks outwardly until the ledge passes vertically below the hooks, the resiliency of the hooks permitting return of the hooks inwardly through the slots to a free position above the ledge to lock the pan to the block.

9. An oil pan as in claim 8, the plate having a hook at its upper end engagable over the top edge of the outermost wall to removably secure the two together.

10. An oil pan as in claim 9, the biasing means comprising a finger-like plate retaining tab punched from the outermost wall so as to project laterally outwardly therefrom to form a V-shaped opening receiving the lower portion of the plate therein, the tab being reversely bent to exert a spring-like force on the plate biasing the plate flat against the outermost wall with the hooks biased laterally inwardly through the slots.

11. An oil pan as in claim 10, the outermost wall including a number of sets of a pair of slots and a tab circumferentially spaced around the outermost wall, and a mating number of retaining plates, the pan being removable from the block upon the camming outwardly of the plate hook ends to clear the outermost portion of the ledge and a subsequent vertical downward movement of the trough and pan from the ledge past the hook ends.

* * * * *